(12) United States Patent
Schrader et al.

(10) Patent No.: US 9,344,184 B2
(45) Date of Patent: May 17, 2016

(54) APPARATUS AND METHOD FOR THE PRODUCTION OF FOOD

(71) Applicant: ALBERT HANDTMANN MASCHINENFABRIK GMBH & CO. KG, Biberach (DE)

(72) Inventors: Wolfgang Schrader, Biberach (DE); Lothar Miller, Burgrieden-Rot (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 0 days.

(21) Appl. No.: 14/229,449

(22) Filed: Mar. 28, 2014

(65) Prior Publication Data

US 2014/0335788 A1    Nov. 13, 2014

(30) Foreign Application Priority Data

May 10, 2013   (EP) .................................... 13167244

(51) Int. Cl.
```
H04W 4/00     (2009.01)
H04B 7/24     (2006.01)
A22C 18/00    (2006.01)
H04L 29/08    (2006.01)
H04W 52/38    (2009.01)
```
(52) U.S. Cl.
CPC H04B 7/24 (2013.01); A22C 18/00 (2013.01); H04L 67/12 (2013.01); H04W 4/008 (2013.01); H04W 52/383 (2013.01)

(58) Field of Classification Search
CPC .... H04B 5/0025; H04B 5/0031; H04B 5/005; H04B 5/02
USPC ......................... 455/41.1, 41.2, 41.3
See application file for complete search history.

(56) References Cited

U.S. PATENT DOCUMENTS

| | | | |
|---|---|---|---|
| 5,958,030 A | 9/1999 | Kwa | |
| 2003/0205446 A1* | 11/2003 | Ziegler | G05B 19/4185 198/575 |
| 2004/0157559 A1* | 8/2004 | Sugikawa | 455/41.2 |
| 2007/0057789 A1* | 3/2007 | Hamerly et al. | 340/572.1 |
| 2008/0218354 A1* | 9/2008 | Lorentz et al. | 340/572.7 |
| 2009/0221233 A1* | 9/2009 | Nakajima | 455/41.1 |
| 2009/0325625 A1 | 12/2009 | Hugl et al. | |
| 2010/0095514 A1* | 4/2010 | Santamaria | B21D 51/2692 29/563 |
| 2011/0061347 A1* | 3/2011 | Stoiber | B29D 22/003 53/558 |

(Continued)

FOREIGN PATENT DOCUMENTS

| | | |
|---|---|---|
| DE | 29624219 U1 | 3/2001 |
| EP | 1885085 A1 | 2/2008 |
| EP | 2073315 A2 | 6/2009 |

(Continued)

OTHER PUBLICATIONS

European Search Report for EP 13167244, dated Dec. 4, 2013.

*Primary Examiner* — Wen Huang
(74) *Attorney, Agent, or Firm* — Marshall, Gerstein & Borun LLP

(57) ABSTRACT

A method for the transmission of process data between different devices that are involved in a process for the production of food, in particular devices involved in a filling line, wherein the data communication between two devices takes place exclusively between at least one transmitter of a first device and at least one receiver of a second device, and/or between at least one transmitter of the second device and at least one receiver of the first device.

24 Claims, 5 Drawing Sheets

(56) References Cited

U.S. PATENT DOCUMENTS

| | | | |
|---|---|---|---|
| 2011/0076944 A1* | 3/2011 | Mihota | 455/41.2 |
| 2011/0136434 A1* | 6/2011 | Choi | 455/41.2 |
| 2014/0333439 A1* | 11/2014 | Downing et al. | 340/573.3 |
| 2015/0044965 A1* | 2/2015 | Kamon et al. | 455/41.1 |

FOREIGN PATENT DOCUMENTS

| | | |
|---|---|---|
| JP | 2001-138916 A | 5/2001 |
| JP | 2003-176021 A | 6/2003 |
| WO | WO-2006/067528 A2 | 6/2006 |
| WO | WO-2009/118856 A1 | 10/2009 |

\* cited by examiner

APPARATUS AND METHOD FOR THE PRODUCTION OF FOOD

CROSS-REFERENCE TO RELATED APPLICATION

This application claims priority to European patent application 13 167244.6, filed Mar. 10, 2013. The priority application, EP 13167244.6, is hereby incorporated by reference.

FIELD OF THE DISCLOSURE

The present disclosure relates to a method and an apparatus for the transmission of process data between different devices that are involved in a process for the production of food, especially of meat and sausage products, in particular devices involved in a filling line, for example for Ethernet-based fieldbus systems.

BACKGROUND

In the production of food, in particular in the production of meat and sausage products, there is a plurality of individual devices in the production line, the function of each of which must be coordinated with one another. Until now, conventional cables and connectors have been used in the transmission of process data for Ethernet-based fieldbus systems. In the case of machines used in harsh environments, cables and connectors often lead to malfunctions, standstills and breakdowns.

In the case of electrical plug-in connectors, the connector pin and the associated socket contact in particular are susceptible to mechanical damage, contamination and corrosion when the plug-in connector is in an unmated state. In the case of most of the plug-in connectors available on the market, even water or cleaning chemicals can penetrate through the plug-in connector into the cable when these connectors are in an unmated state, and permanently damage these through corrosion. The transition from the connector pin or socket contact respectively to the cable is likewise subject to a high risk of oxidation due to the different materials. This leads to high contact resistances and leakage currents.

Data transmission by means of WLAN or Bluetooth is currently used as an alternative to the transmission of process data by means of cables.

FIG. 7 shows a corresponding solution. Existing standards are used for the radio transmission. The frequency band lies within the range of 2.4 or 5 or 60 GHz, for example WLAN 802.11X or Bluetooth 3.0+HS.

As a rule, a WLAN comprises an access point and a plurality of participants, which share the available bandwidth as is particularly evident from FIG. 7. The individual devices A, B, C thereby communicate with the corresponding access point/router. Here, fault detection, collision recognition and arbitration mechanisms are necessary. This makes it difficult to estimate the temporal behavior, and makes the response times unpredictable. Bluetooth offers similar capabilities and has similar disadvantages.

But even this solution has disadvantages in that it is relatively slow as compared to cable connections, and in particular, is susceptible to radio interference. In addition, in particular in the case of a plurality of transmitters, there is the disadvantage that the receiver must be adjusted to the desired transmitter, which involves a considerable configuration effort and creates a source of errors. Few radio frequencies are available. If a plurality of transmitters and receivers are operated within range, malfunctions will occur due to adjacent transmitters. The bandwidth must be shared with other devices. If the available bandwidth is not sufficient, it will not be possible to operate the devices simultaneously. A suitable radio channel must be selected and adjusted. The temporal allocation of the transmission capacity likewise plays a role, so that it is necessary to wait for a free channel and in addition, the repetition of the transmission in the event that there is interference in the reception takes time. Changing channels when new malfunctions arise also takes time. In addition, this method is not deterministic. It is not possible to predict how long a successful transmission will take. All told, no transmission of process data in can be performed in real time.

SUMMARY OF THE DISCLOSURE

Proceeding from this, the object of the present invention is to provide an improved method and an improved apparatus for data transmission, in particular between two devices for the production of food, which make reliable and rapid data transmission in real time possible in a simple manner.

In the case of the method according to the present disclosure for the transmission of process data between different devices that are involved in a process for the production of food, in particular devices involved in a filling line, the data communication between two devices advantageously takes place exclusively between a transmitter of a first device and a receiver of a second device and/or between a transmitter of the second device and a receiver of the first device. In so doing, the transmission path is located between the devices.

This means that the number of participants is reduced to two. In this way, the entire bandwidth can be made available to the two participants. The constant rearbitration of the radio channel is thereby omitted. The availability of the radio link is increased and the reaction time is reduced. This makes a reliable transmission possible in real time. This means that the data for the corresponding devices is not transmitted by means of the access point or the router, but rather that communication takes place directly from device to device.

It is also possible for a device to have a plurality of transmitters and corresponding receivers facing the opposite direction thereto.

According to the present disclosure, a transmitter of a first device thus communicates exclusively with a corresponding receiver of a second device, in such a way that the receiver of the second device receives the data from the first device, but receivers of a third or additional device cannot receive the process data, in particular due to the low signal levels. In particular, the transmitters of the second or additional device also each communicate with only one receiver. The receivers of the third or additional device likewise each only communicate with one transmitter.

Because the data from a transmitter of a respective device can only be received by a specific receiver, and not by the receivers of other devices, there is the advantage that the same channels can be used for different pairs of devices.

In the case of the present disclosure, it is especially advantageous when a transmitter is respectively aligned to the corresponding receiver. In so doing, directional antennas are preferably used as transmitters and/or preferably also used as receivers. When corresponding directional antennas are used, the signal strength can be reduced, and it is possible to ensure in a simple manner that the corresponding signal is not received by other receivers.

In order to maintain the correct alignment of the transmitter to the receiver, a mechanical coupling is used between the devices.

The transmission power of the transmitter of the first device can be adjusted in such way that only the receiver of the second device receives the signal, wherein the power of a radio signal is especially <100 mW. This also applies to additional transmitter/receiver pairs.

The distance 1 between the transmitter and the corresponding receiver and preferably also between the additional transmitters and receivers, preferably lies within the range of 0 to 1 m. Due to the relatively close arrangement of the devices to one another, on the other hand, the signal strength can be reduced, and thus it is possible to ensure that the data transmission only takes place between two devices in the form of a point-to-point radio link.

Thus according to the present disclosure, a plurality of pairs of devices may be operated in the same frequency range, in particular in the same radio channel. Malfunctions are not expected.

When a plurality of devices are disposed in series, at least one device between the first and final device in the series can receive data from the transmitter of the preceding device by means of the receiver thereof, and can forward data to the subsequent device by means of a transmitter. Thus data or messages can be pushed through a series of devices, i.e. the devices involved simply continue to forward the message to the addressee.

In so doing, the entire bandwidth is available to each pair. The selected channel is always free, transmission can always occur immediately and ideally, no malfunctions occur and there is no data loss. There is therefor also no time lost as a result of repeated transmissions. A simple error correction on the receiver side is sufficient. Since only one transmitter having an adequate field strength is received, no addressing is required.

It is especially advantageous if the transmission path between the transmitter and the receiver is shielded. This makes it possible to prevent malfunctions as a result of environmental influences and other radio networks. In addition, delays as a result of any error corrections and repeated transmissions of erroneous information are avoided. The availability of the radio link is thus improved, and the reaction time is reduced.

According to the present disclosure, at least the first device and at least the second device may each have a combined transmitter/receiver device such that a transmission in each case is only possible in a single direction at a time. It is also possible that at least the first device and at least the second device each have a transmitter and a receiver such that a simultaneous flow of data between both of the devices is possible in two directions (duplex operation). In addition, different frequency channels can be used for this purpose in order to minimize mutual interference.

As already explained, the data is preferably transmitted by means of electromagnetic waves, in particular radio waves. In order to achieve a transmission speed of 10 or 100 Mbit/s for example, as is common for current fieldbuses, the selected transmission frequency must be correspondingly high. Current radio link standards such as WLAN 802.11x with 2.4 or 5 GHz are suitable in this case.

The 60 GHz band is especially advantageous. This band can be used nearly world-wide without registration and approval, provides a high bandwidth and interference-free transmission. The high damping due to air, which is usually a disadvantage of this frequency band, is an advantage in this case. In the case of antennas having an appropriate directivity, almost no influence by adjacent radio links is to be expected.

An apparatus for the production of food, in particular for implementing the method, has at least a first device having a transmitter and a second device having a receiver, wherein the data communication between the two devices takes place exclusively between the transmitter of the first device and the receiver of the second device, and/or between a transmitter of the second device and a receiver of the first device. This apparatus thus comprises at least two devices, wherein a transmitter of a device can communicate exclusively with a receiver of an additional device, and cannot communicate with an additional receiver of the additional devices of the apparatus.

In each case, the transmitter is aligned towards the receiver, wherein here, the corresponding transmitter is preferably designed as a directional antenna and/or the receiver may also be designed as a directional antenna. In addition, the apparatus has a coupling device, in order to mechanically couple the devices in such a way that the corresponding transmitter and receiver are and remain correctly aligned towards one another.

The distance L between the transmitter and receiver of the two communicating devices advantageously lies between 1 cm and 1 m.

The apparatus preferably has a shield, for example such as a grounded sheet of metal. The shield is disposed around the transmission path between the devices.

As already explained, either the transmitter and/or the receiver can be designed as an antenna, but may also be designed as an optic coupler having a photodiode or laser diode as a transmitter, and a photo detector as a receiver. The frequency range, preferably with coherent light, lies in a wavelength range of 400 to 1000 nm.

When the apparatus comprises a plurality of devices in series, each pair of devices can communicate with one another in such a way that information can be forwarded from one device to the other by means of intermediary devices. Thus when more than two devices are to communicate with one another, independent connections can be established between each of the devices. The devices involved simply forward the message to the addressee. The devices simultaneously serve to shield the transmission path.

The present disclosure is explained in greater detail below with reference to the following Figures.

DETAILED DESCRIPTION OF THE PREFERRED EMBODIMENTS

Figure 1:
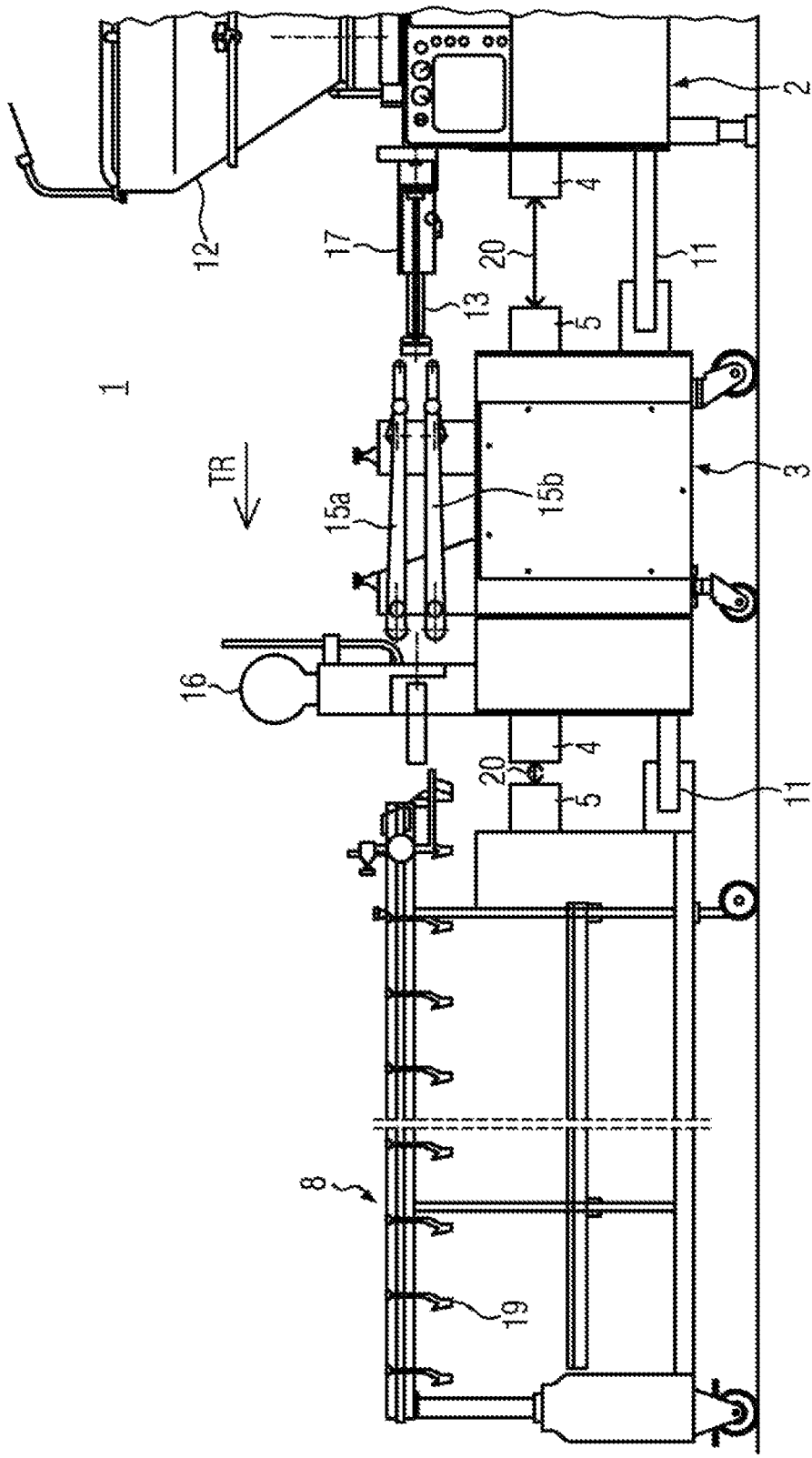
FIG. 1 shows a rough schematic representation of an apparatus, in this case a filling line, according to the present disclosure.

FIG. 1 shows a schematic representation of a filling line having a plurality of devices 2, 3, 8. Here, a filling machine 2 is provided as a first device, for example. The filling machine has a hopper 12 in a known manner, into which the paste-like mass such as sausage meat, for example is filled and discharged by means of a means of conveyance (not shown here, through a filling tube 13 into a sausage casing. The filling machine 2 is a transport device 3 disposed downstream in the direction of transport TR, for example, which device has two circulating conveyor belts 15*a,b*, between which the filled string of sausages is transported. The transport device 3 can also prevent the string of sausages from twisting when the filled string of sausages is rotated by a twist-off unit 17 in order to create a twist-off point. The transport device 3 thereby represents an additional second device according to the present disclosure.

In addition, a clipper 16 for placing a clip between two sausage portions may also be disposed in the second device in the line. Finally, a hanger 8 is also disposed in this specific example, which can pick up and further transport individual sausages or sausage portions on the hooks 19 thereon, and which represents a third device.

The layout shown in FIG. 1 is only an example. A filling line may also have a different layout having different attachments in a different sequence. Each of the devices comprises a corresponding transmitter of receiver respectively in order to transmit process data from one device to the other. Here, the filling machine 2 has a first transmitter 4 and the transport device 3 has a receiver 5. In this way, the filling machine can transmit data from the first transmitter 4 to the second transmitter 5 by means of the data transmission path 20. The transport device 3 also has a first transmitter 9 and the hanger 8 has a first receiver 10, so that data can also be forwarded from the transport device to the hanger by means of the transmission path 20.

The three devices 2, 3 and 8 are also each mechanically coupled in sequence with one another by means of a mechanical coupling device 11 in such a way that the transmitters and receivers, which are oriented facing one another (with a deviation that ranges from zero to a few centimeters) are able to remain aligned towards one another.

The data transmission according to the invention is explained in greater detail below with reference to FIG. 2.

Figure 2:
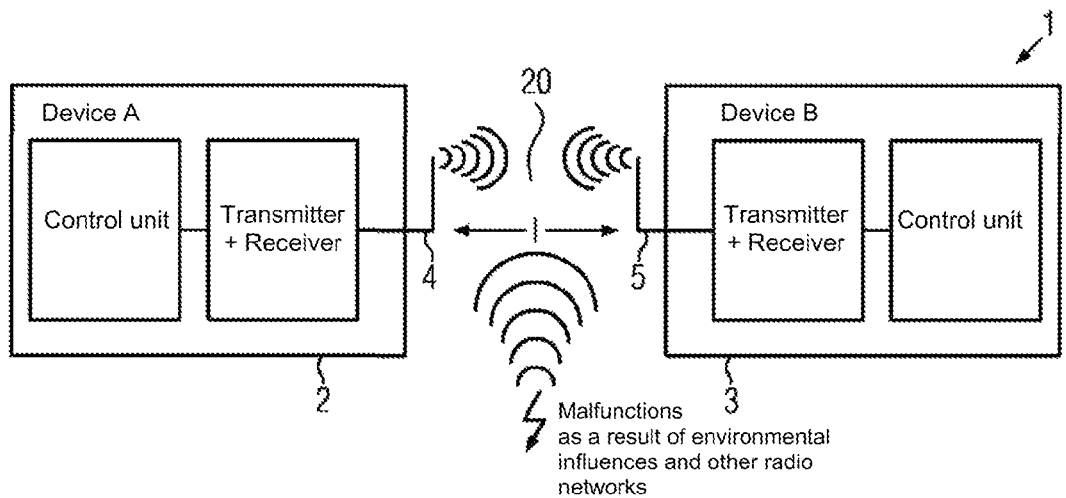
FIG. 2 shows a rough schematic representation of an embodiment of the present disclosure.
Figure 6:
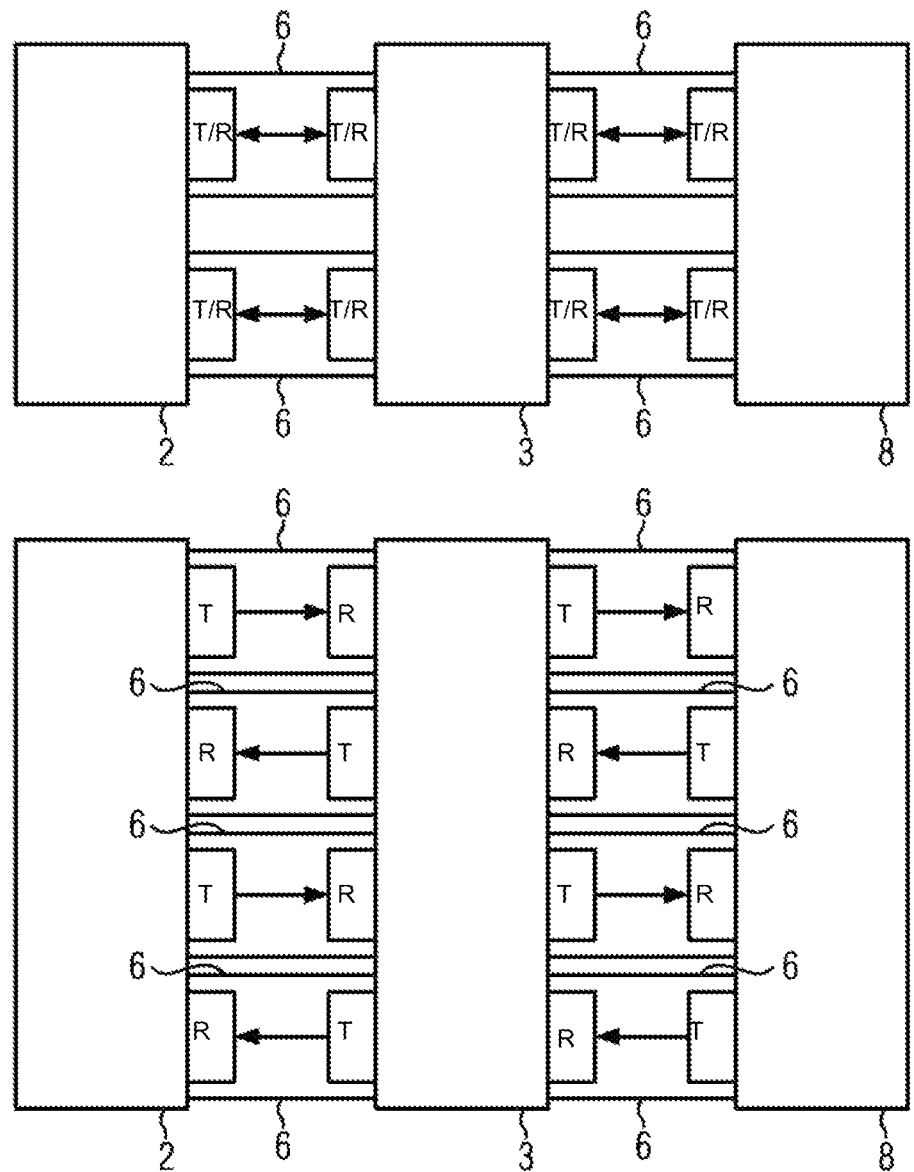
FIG. 6 shows a further embodiment according to the present invention.

FIG. 2 shows two devices 2 and 3, which communicate with one another, for example the filling machine 2 and the transport device 3. Both the device 2 and the device 3 each have a control unit as well as a transmitter and receiver. The apparatuses operate in a frequency range of 2.4 to 60 GHz. In this case, combined transmitter and receiver devices 4, 5, in particular in the form of directional antennas, are provided. The antennas are aligned directly towards one another and have a have a small spacing within the range of 1 cm to 1 m. Through the correct alignment and the small dimension of the transmission path 20, only a low transmission power of <100 mW is necessary. Because the number of participants that communicate with one another is reduced in each case to just two, the antennas are placed close together and antennas having directionality are used, the entire bandwidth can be made available to both participants. This eliminates the constant rearbitration of the radio channel, increases the availability of the radio link and reduces the reaction time. In contrast to the known network shown in FIG. 6, there is no access point or router here.

The transmission power and directionality of the antenna are selected in such a way that the assigned receiver receives a sufficiently high signal and at the same time, a receiver of an additional or adjacent device receives only a very low signal, which is too small for that receiver to receive the process data. Because of the arrangement of the antennas between the devices, the housings of the devices shield the antennas. The low range of the electromagnetic waves, for example in the 60 GHz band, provides an advantage here.

Figure 3:
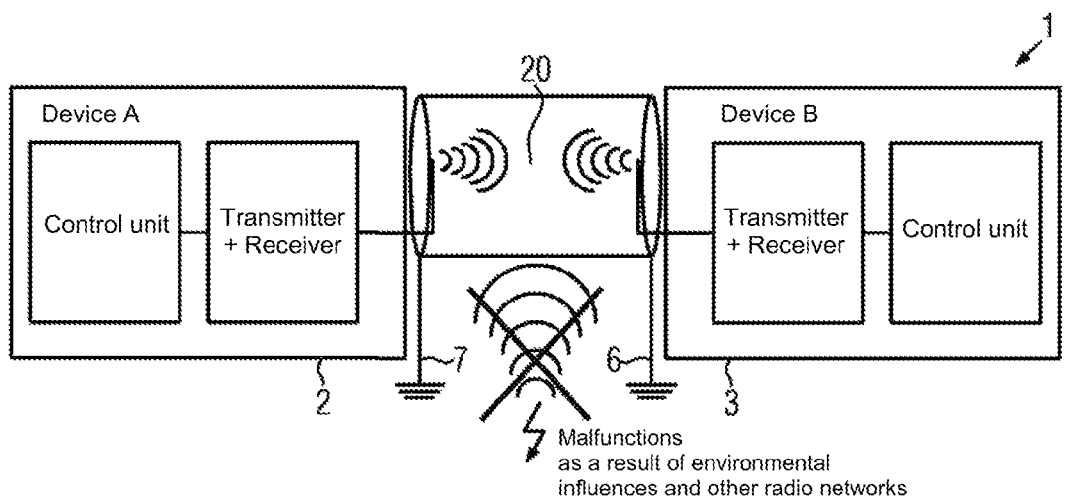
FIG. 3 shows a rough schematic representation of the embodiment shown in FIG. 2 with shield.
Figure 7:
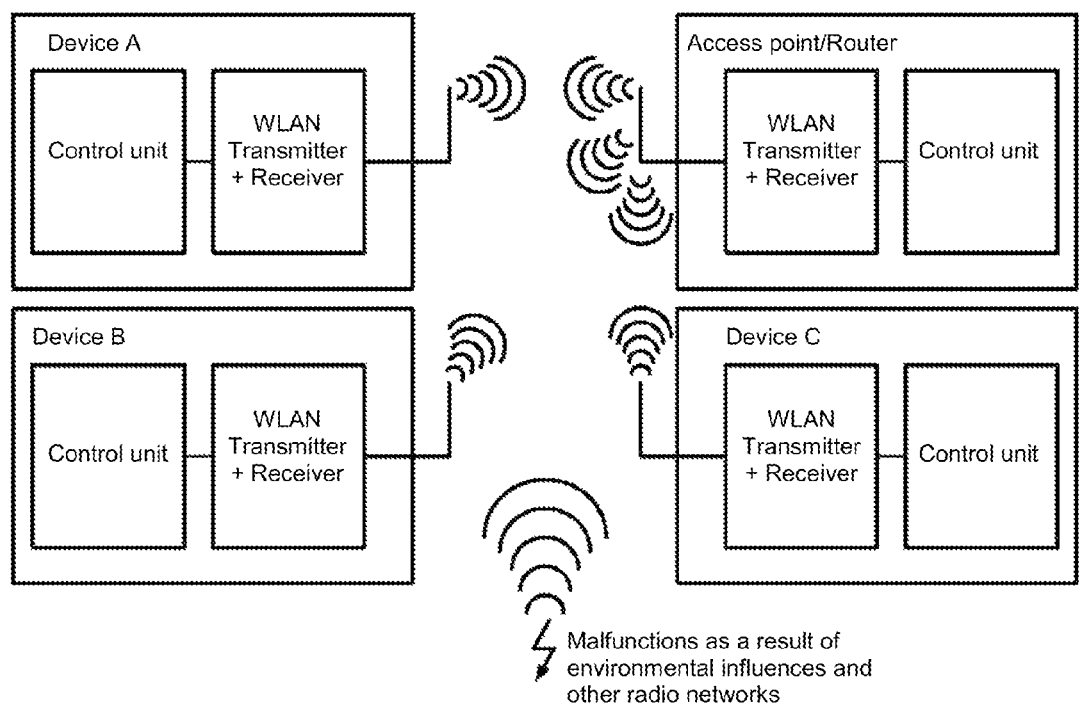
FIG. 7 shows a rough schematic representation of a WLAN network according to prior art.

In order to further protect the transmission path against malfunctions and external influences, a shield 6 may be provided, which is preferably provided around the transmission path 20 as shown in FIG. 3. The antennas are also located within the shield. Sheet metal may be used as a shield, for example. The shield 6 is grounded, as shown by the reference FIG. 7. This allows a malfunction through environmental influences and other radio networks to be minimized. In this way, delays as a result of error corrections and repeated transmissions of erroneous information packets can be avoided. The availability of the radio link is thus improved, and the reaction time is reduced.

In general, this means that the filling machine 2 can exchange data with the transport device 3 by means of the transmission path 20, for example, however cannot communicate directly with the device 8, since the receiver 10 of the third device 8 can no longer receive the radio signals of the transmitter 4.

Thus a plurality of pairs of devices can also be operated simultaneously and independently of one another on the same radio channel. A plurality of filling lines disposed parallel to one another may also use the same radio channel. In so doing, the entire bandwidth is available to each pair. The selected channel is always free, a transmission can always be transmitted immediately, and ideally, no malfunctions and thus no data losses occur. There is also no time lost as a result of repeated transmissions. An error correction can be performed if necessary, wherein a simple error correction on the receiver side is sufficient.

There are different methods of ensuring that, in the case of transmission, all data transmitted from device 2 arrives correctly at in device 3.

Device 3 must first detect whether data is missing or corrupted as a result of malfunctions. When device 3 detects an error, it can request the data again from device 2. This method is poorly suited for real-time transmission, since it is not possible to predict how many requests will be needed until the data is correctly transmitted. Thus it is also not possible to predict the time needed therefor. When the transmission path is very reliable and not prone to malfunctions, as in the method described here, it is sufficient if the data in the transmitter is supplemented by additional, redundant information for error correction, for example. The receiver can thus reconstruct a defined portion of corrupted data that is received without requesting that the data be resent. In this way, no additional time is needed for the transmission.

Since only one transmitter having an adequate field strength is received by each receiver, addressing is also not required. A transmission in real time is possible.

Figure 4:
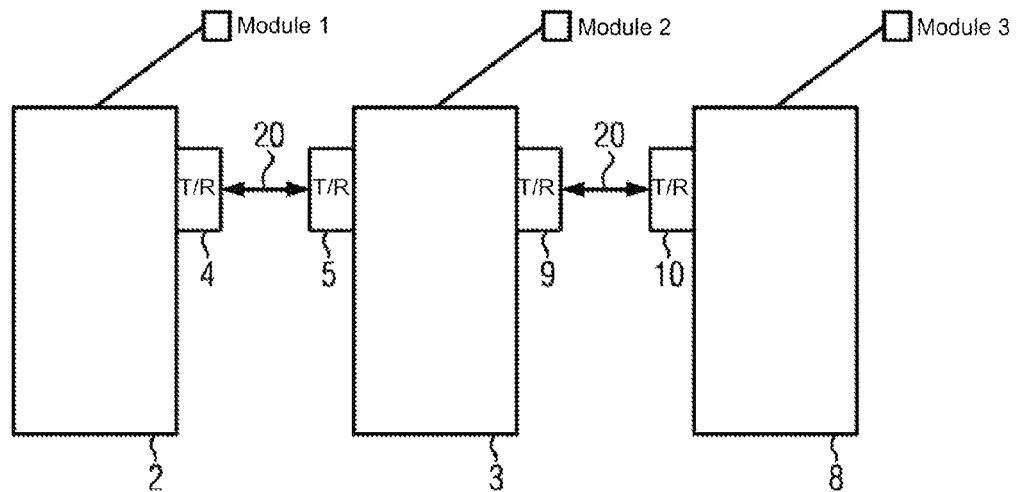
FIG. 4 shows a rough schematic representation of a further embodiment having more than two devices involved.

As shown in FIG. 1 and explained in greater detail in conjunction with FIG. 4, when a plurality of devices are to communicate with one another, independent connections can be established in each case between the devices. The devices involved then simply forward the messages to the addressee by means of an intermediary device. FIG. 4 shows a schematic representation of the three devices 2, 3 and 8. If information is now to be forwarded from the filling machine 2 to the hanger 8, the corresponding data can thus be forwarded to the second device, in this particular embodiment, the transport device 3, by means of the transmitter 4 and the receiver 5, and from this second device to the receiver 10 of the third device, in this case the hanger, by means of the transmitter 9. In this same way, the hanger 8 can communicate with the filling machine 2. This means therefore that that information can be forwarded from one device to the next by means of intermediary devices, when an apparatus comprises a plurality of devices in series, wherein each pair of adjacent devices communicate with one another in such a way.

Figure 5:
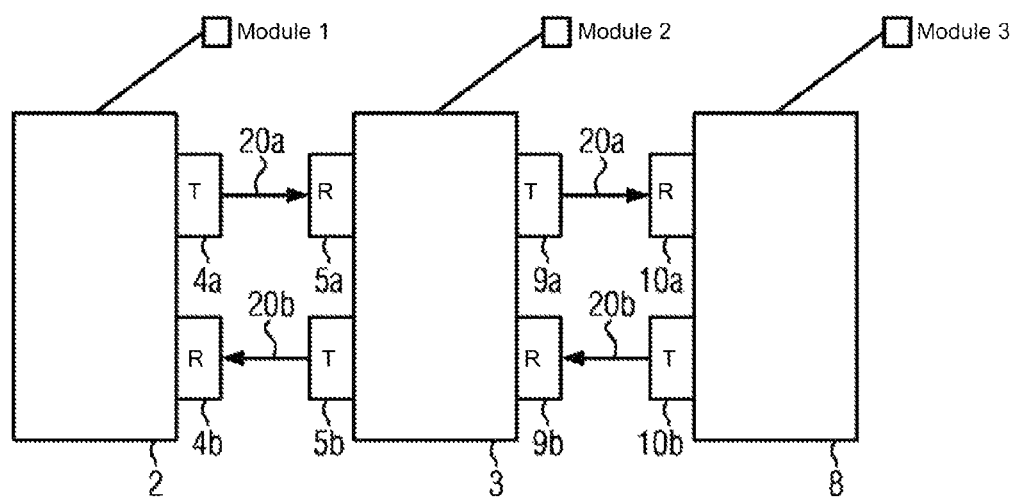
FIG. 5 shows a rough schematic representation of a further embodiment, which is suitable for duplex operation.

In the preceding Figures, combined transmitter/receiver devices 4, 5, 9, 10 are shown with a common antenna. The transmission is then only possible in a single direction at a time. Alternatively, two transmission paths 20a,b may be used, as shown in FIG. 5. A simultaneous flow of data in both directions is then possible. In addition, different frequency channels may also be used in order to minimize the mutual interference. The radio link between the devices can also take place at the same frequency, but may also be designed such that it is adjustable of even self-adjusting.

In the case of the preceding embodiments, the data transmission was explained by means of electromagnetic radio signals. A data transmission is likewise possible in the same manner by means of light waves, however, in particular coherent light in a wavelength range of 400 nm to 1000 nm. In so doing, corresponding laser diodes are then used as transmitters 4, 9 and corresponding photo detectors are used as receivers, for example photo-transistors or PIN diodes.

The method according to the present disclosure is explained in greater detail below with reference to FIGS. 1 to 5. In the production of sausage, the main controller of the filling machine 2 process data generates data, in particular process data for the transport device 3 and the hanger 8. The data communication between the filling machine 2 and the transport device 3 takes place exclusively between the transmitter 4 and the receiver 5. The receiver 5 is only able to receive data from the transmitter 4. At the same time, only the receiver 5 can receive data from the transmitter 4. The transmitters and receivers 9, 10, which are disposed between the additional devices, cannot receive the corresponding radio signals due to the low signal level. The entire transmission capacity is available to the transmitter and receiver 4, 5. Addressing is not necessary. The device 3 can then operate the conveyor belts 15a,b and the clipper, for example, in accordance with the process data. Process data relating to the hanger 8 is also forwarded to the receiver 5 by means of the transmitter 4. Corresponding data received from the receiver 5 is then directly forwarded by means of a corresponding control unit, in this case the transmitter 9, which in turn sends the appropriate data, which can only be received by the receiver 10. The hanger 8 can then be appropriately operated by means of the process data received by the receiver 10.

As explained in conjunction with FIG. 4, the transmitters and receivers can either be constructed in such a way that a transmission between two devices is only possible in one direction at a time or, as explained in conjunction with FIG. 5, the transmitters and receivers may be disposed in such a way that duplex operation is possible, e.g. a simultaneous flow of data in both directions.

Data received by the corresponding receiver 9 of the second device may then also be routed back to the filling machine by means of a corresponding transmitter 5, 5a and to a corresponding receiver 4, 4a via a corresponding line and a corresponding control unit. The mechanical fastening means 11 ensure that the corresponding antennas always remain correctly aligned towards one another. Here, the housing of the second device 3 shields the transmission paths 20 between the devices 3, 8 and between the devices 3, 2, shielding the devices from one another. In addition, however, a corresponding shield may also be provided around the transmission path 20.

According to the preceding embodiments, in each case there was only one transmission path in each direction, since the data transmission between two devices takes place exclusively between a transmitter of a first device and a receiver of a second device, and/or between a transmitter of the second device and a receiver of the first device. As is particularly evident from FIG. 6, it is also possible that a device may have a plurality of transmitters and accordingly, may have receivers oriented in the opposite direction. The appropriate shields 6 may then preferably be provided. The plurality of transmitters between two devices preferably must then transmit on different channels. In the case of very good shielding, the same channel can be used if necessary. As in the preceding embodiments, either separate transmitters and receivers or transmitter/receiver combinations may be used. Only one transmission path in each direction will preferably be selected between two devices however, as is the case in the embodiments shown in FIGS. 2 to 5.

The invention claimed is:

1. A method for the transmission of process data between different devices that are involved in a process for the production of meat and sausage products,
comprising:
providing a plurality of different devices of a filling line, the function of each of which must be coordinated with each other;
communicating data exclusively at least one of between two devices between at least one transmitter of a first device and at least one receiver of a second device respectively, or
between at least one transmitter of the second device and at least one receiver of the first device, wherein the transmission path is located between the first and second devices, and adjusting a transmission power of the transmitter of the first device in such a way that only the corresponding receiver of the second device receives the signal.

2. The method according to claim 1, the transmitter of the first device communicating exclusively with the corresponding receiver of the second device in such a way that the receiver of the second device receives the data from the transmitter of the first device, but receivers of a third or additional device cannot receive this process data.

3. The method according to claim 2, and the receivers of the third or additional device each only communicate with one transmitter.

4. The method according to claim 1, and aligning a corresponding transmitter towards a corresponding receiver.

5. The method according to claim 4, and maintaining the correct alignment of the transmitter to the receiver by means of a mechanical coupling between the devices.

6. The method according to claim 4, and in aligning the corresponding transmitter towards the corresponding receiver, the transmitter is a transmitting antenna.

7. The method according to claim 4, and in aligning the corresponding transmitter towards the corresponding receiver, the receiver is a receiver antenna.

8. The method according to claim 1, and positioning the transmitter and the corresponding receiver relative to one another such that a distance between them lies within a range of 1 cm to 1 m.

9. The method according to claim 1, and operating a plurality of pairs of devices in the same frequency range.

10. The method according to claim 9, and in operating the plurality of pairs of devices in the same frequency range, operating the plurality of pairs in the same radio channel.

11. The method according to claim 1, and disposing a plurality of devices in series, at least one device between the first and last device of the series receiving data from a transmitter of the preceding device by means of the receiver thereof, and forwarding data to the subsequent device by means of a transmitter.

12. The method according to claim 1, and shielding the transmission path between the transmitter and the receiver from the outside.

13. The method according to claim 1, and supplying each of at least the first device and at least the second device with a combined transmitter/receiver device such that a transmission in each case is only possible in a single direction at a time.

14. The method according to claim 1, and in transmitting the data, the data is transmitted by means of electromagnetic waves.

15. The method according to claim 14, and in transmitting the data, the electromagnetic waves include one of radio waves or light waves.

16. The method according to claim 1, and in adjusting the transmission power of the transmitter of the first device, the power of a radio signal is <100 mW.

17. The method according to claim 1, and supplying each of at least the first device and at least the second device with a transmitter and a receiver such that a flow of data between the two devices is possible in two directions at a time.

18. An apparatus for the production of meat and sausage products, comprising
   a first device with at least one transmitter;
   a second device with at least one receiver;
   said first and second devices being part of a plurality of different devices of a filling line the function of each of which must be coordinated with each other;
   data communication between the first and second devices taking place at least one of between at least one transmitter of the first device and at least one receiver of the second device respectively, the transmitter of the first device having a transmission power settable to a transmission power that permits only reception of the signal generated by the transmitter of the first device by the at least one receiver of the second device, or
   between at least one transmitter of the second device and at least one receiver of the first device, wherein the transmission path is located between the first and second devices, and the transmitter of the second device having a transmission power settable to a transmission power that permits only reception of the signal generated by the transmitter of the second device by the at least one receiver of the first device.

19. The apparatus according to claim 18, the transmitter being aligned towards the corresponding receiver.

20. The apparatus of claim 19, the two devices coupled to one another by a mechanical coupling device.

21. The apparatus according to claim 18, and a distance between the transmitter and the receiver of the two communicating devices being between 1 cm and 1 m.

22. The apparatus according to claim 18, further comprising a shield, which is disposed around the transmission path between the devices.

23. The apparatus according to claim 18, at least one of the transmitters or the receivers being one of directional antennas, or as an optical coupler having a light-emitting diode or laser diode as a transmitter, and a photo detector as a receiver.

24. The apparatus according to claim 18, further comprising a plurality of the devices in series, wherein each set of two adjacent devices communicate with one another in such a way that information can be forwarded from one device to the other by means of intermediary devices.

* * * * *